United States Patent
Johnson et al.

(10) Patent No.: US 7,836,192 B2
(45) Date of Patent: Nov. 16, 2010

(54) PARENTAL CONTROLS FOR A MEDIA CONSOLE

(75) Inventors: Jerry Alan Johnson, Medina, WA (US); Daniel M. C. Caiafa, Redmond, WA (US); Jeffrey L. Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 11/182,991

(22) Filed: Jul. 15, 2005

(65) Prior Publication Data

US 2007/0013515 A1 Jan. 18, 2007

(51) Int. Cl.
*G06F 15/16* (2006.01)
*G06F 15/173* (2006.01)
*G06F 19/00* (2006.01)

(52) U.S. Cl. .......................... 709/229; 709/223; 463/29

(58) Field of Classification Search ................. 709/223, 709/225, 229; 725/28; 463/29; 348/156; 726/17, 21, 28; 713/185
See application file for complete search history.

(56) References Cited

U.S. PATENT DOCUMENTS

| | | | |
|---|---|---|---|
| 6,658,415 B1* | 12/2003 | Brown et al. | 709/229 |
| 6,678,733 B1* | 1/2004 | Brown et al. | 709/229 |
| 6,722,984 B1* | 4/2004 | Sweeney et al. | 341/176 |
| 2002/0137565 A1* | 9/2002 | Blanco | 463/46 |
| 2004/0063497 A1* | 4/2004 | Gould | 463/42 |
| 2004/0210639 A1* | 10/2004 | Ben-Yoseph et al. | 709/206 |

\* cited by examiner

*Primary Examiner*—Peling A Shaw
(74) *Attorney, Agent, or Firm*—Workman Nydegger

(57) ABSTRACT

Techniques to enable parental control for a media console are described. One such technique involves enabling user-specific security (or rights) settings. This technique includes first receiving a user identifier from a user interface of a media console. The technique includes next determining a first security profile for the media console based on the user identifier. In this technique, the first security profile defines a supervised operating configuration for the media console that is specific to the user identifier, and which is controlled by an authorized party, such as a parent. Finally, the technique includes enabling use of the first media console subject to the first security profile. In this technique, the first security profile thereby defines parental control choices regarding use of the first media console by the first user, e.g., a child.

20 Claims, 14 Drawing Sheets

PARENTAL CONTROLS FOR A MEDIA CONSOLE

BACKGROUND

In recent years, gaming consoles have become very popular with consumers and in particular with children. Generally, a game console enables a user to play games, movies, and music, and more recently, facilitates the play of games while communicating with other players over the Internet. However, the addition of an Internet connection to a game console that is used by children is of particular concern to many parents. Children are not always aware of their vulnerability to online predators who can coax an unsuspecting child into providing personal information or engaging in unwanted communication, or even agreeing to meet in person. Furthermore, provisions of the Children's Online Privacy Protection Act of 1998 (COPPA) require that Web sites directed to children and general audience sites that knowingly collect personal information from children post privacy policies and obtain parental consent as a prerequisite to collecting such information.

Currently, it can be quite difficult for parents to supervise the activities of their children on a game console unless they are actually present while the child is playing. An Internet connected game console can also be used to make purchases, which provides yet another potential problem for concerned parents desiring to supervise their children's purchases. For example, an unsupervised child can make purchases using a credit card number of which a parent may not become aware until the credit card statement arrives. Yet another concern for parents of young game console users is the mature content of many games designed for adults or more mature audiences. Game and media rating systems have been developed in several countries to provide guidance to parents about the content of games, movies, and music. The rating systems enable parents to identify games having mature content to aid in making a decision about purchasing an item. However, a game rating system is ineffective when a parent is not involved in a purchase decision—for instance, when a child makes an unsupervised purchase. Therefore, a demand exists for new ways for enabling supervised security settings for a media console to establish controls on the online activities of children that address these and other concerns.

SUMMARY

Various systems and techniques to enable parental control for a media console are discussed. One such technique involves enabling user-specific security settings. This technique includes first receiving a user identifier from a user interface of a media console. The technique includes next determining a first security profile for the media console based on the user identifier. In this technique, the first security profile defines a supervised operating configuration for the media console that is specific to the user identifier. Finally, the technique includes enabling use of the first media console subject the first security profile. In this technique, the first security profile establishes a parental control on the use of the first media console by the first user.

A system is for enabling user-specific security setting management for a media console is also discussed. The system includes a console service that is configured for executing a plurality of security setting management functions. The console service can be configured for securely communicating with a user console over a network. The console service can also include a database that can store records employed for managing user-specific security settings. The console service can also include a server computer in communication with the database. The server computer can include a processor and a memory that is in communication with the processor. The server computer memory can store data and machine instructions that cause the processor to carry out a plurality of functions. One such function includes identifying a request for a per-session console security configuration received from a console. This request can include a user identifier and a console identifier. Another function can include matching the user identifier with a user account record in the database in response to identifying the request. The user account record can include a primary computing system identifier that is associated with the user identifier and one or more security related entries. Yet another function can include generating a security privileges ticket based on the user account record and the request. The security privileges ticket that is generated can include a plurality of console security configuration permission indicators. A final function can include providing the security privileges ticket to the console.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Exemplary Gaming and Media System

Figure 1:
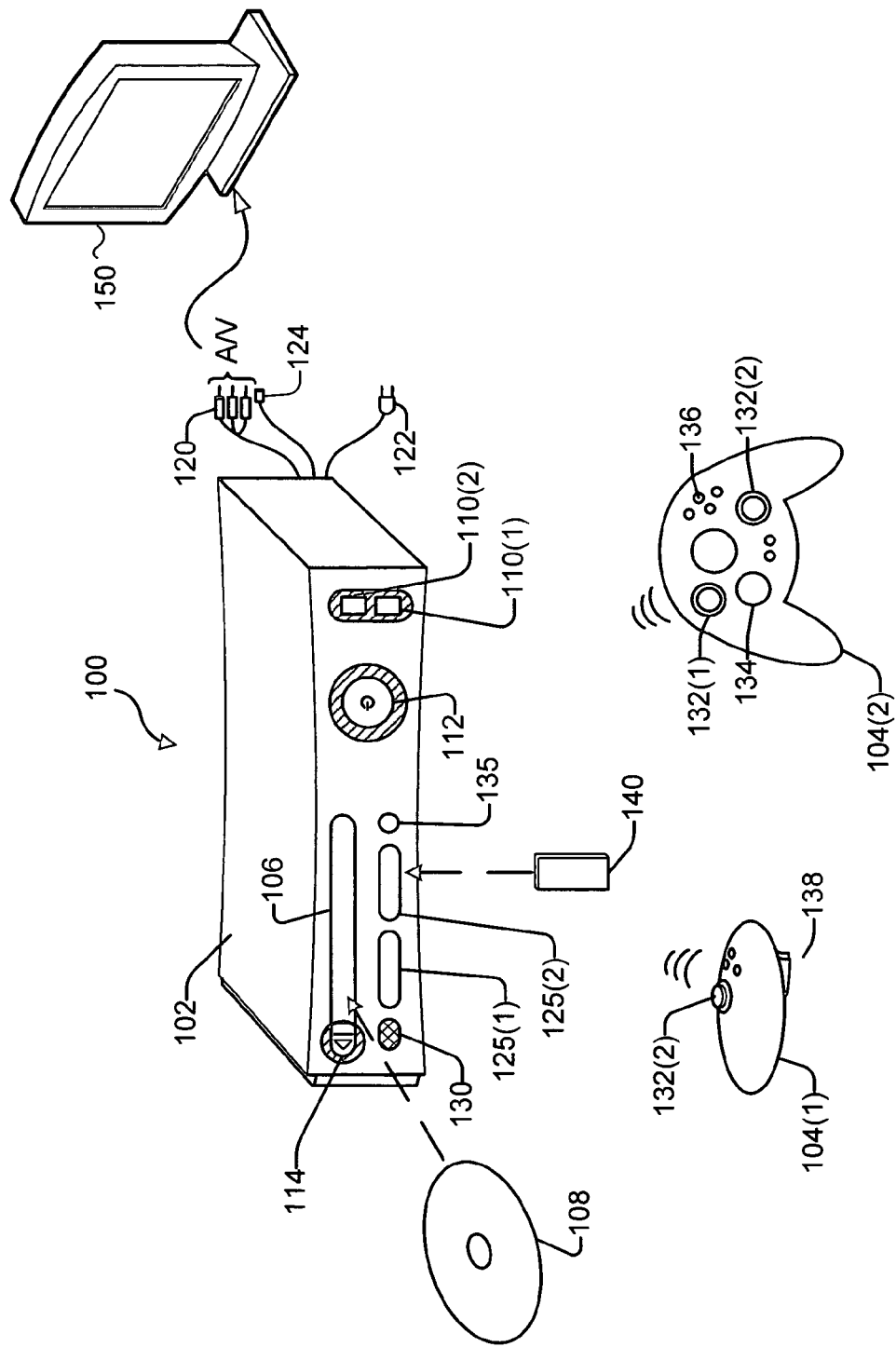
FIG. 1 is an isometric view of an exemplary gaming system with which at least one embodiment of system automated merchandising can be employed.

FIG. 1 shows an exemplary gaming and media system 100. The following discussion of this Figure is intended to provide a brief, general description of a suitable environment in which certain methods may be implemented. As shown in FIG. 1, gaming and media system 100 includes a game and media console (hereinafter simply "console") 102, which is an example of what is referred to in the claims that follow as a "media console." In general console 102 is one type of computing device or system, as further described below, and is exemplary of a device that is used in connection with techniques for implementing parental control, but is not intended to be limiting. Console 102 is configured to accommodate one or more wireless controllers, as represented by controllers 104(1) and 104(2). Further, console 102 is equipped with an internal hard disk drive (not shown), and a portable media drive 106 that supports various forms of portable storage media, as represented by optical storage disc 108. Examples of suitable portable storage media include DVDs, CD-ROMs, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two Universal Serial Bus (USB) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console and can also provide access to other features and controls, and eject button 114 alternately opens and closes the tray of a portable media drive 106 to enable insertion and extraction of a storage disc 108.

Console 102 connects to a television or other display via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation (not shown), a memory unit (MU) 140 may also be inserted into controller 104 to provide additional and portable storage. Portable MUs enable users to store game parameters for use when playing on other consoles. In this implementation, each controller is configured to accommodate two MUs 140, although more or fewer than two MUs may also be employed.

Gaming and media system 100 is generally configured for playing games, both local and online, interacting with other online users, reading electronic content stored on a memory medium (internal and/or portable as discussed below), shopping for and purchasing products such as electronic media including game and game component downloads, and playing pre-recorded music and videos, from both electronic and hard media sources. With the different storage offerings, titles can be played from the hard disk drive, from optical disk media (e.g., an optical storage disc 108), from an online source, or from MU 140. A sample of some of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

Functional Details of Exemplary Gaming and Media System

Figure 2:
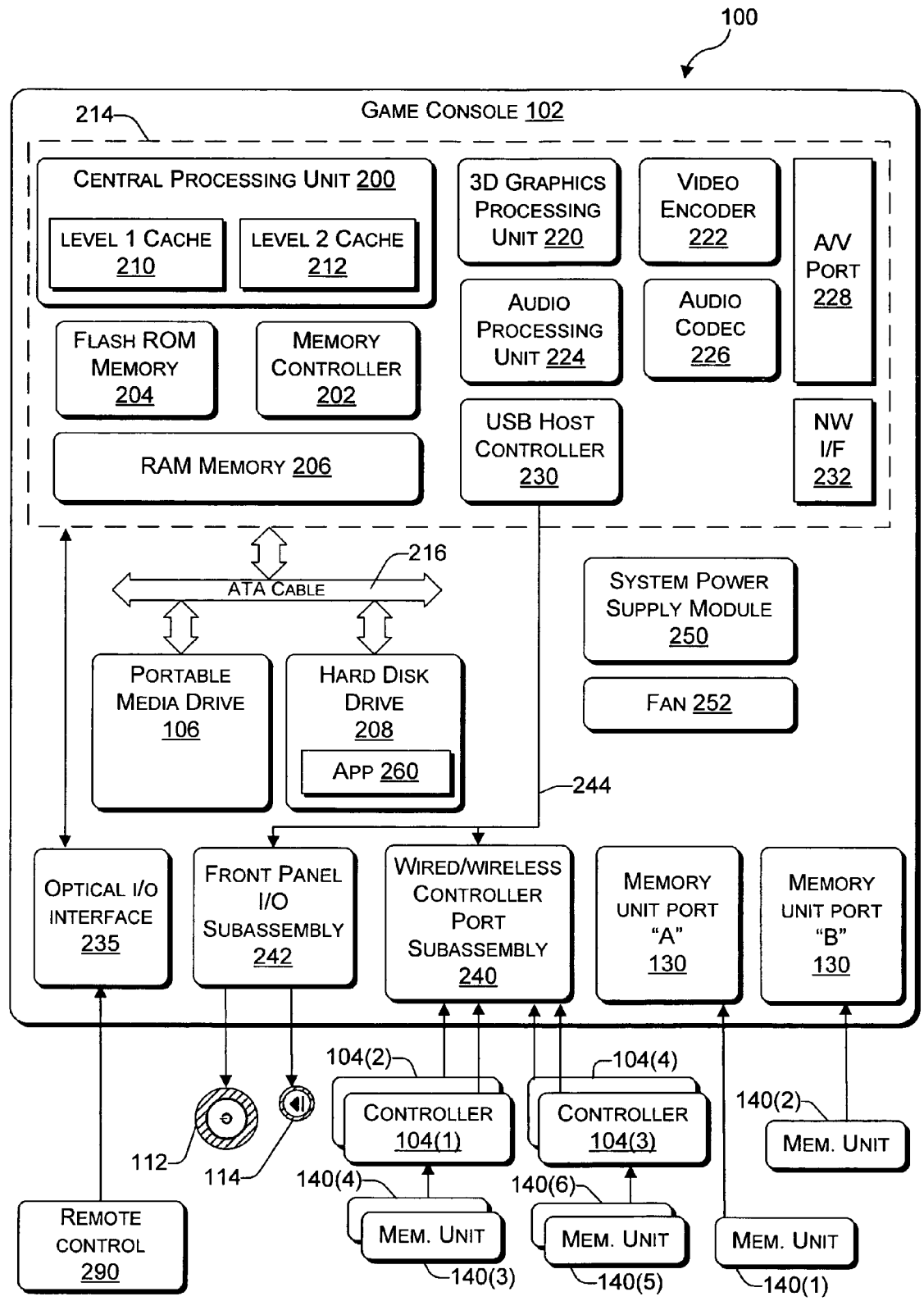
FIG. 2 is an exemplary functional block diagram of a gaming system like that shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, a home network, etc.) and may be any of a wide variety of various wire or wireless interface components including an Ethernet card, a modem, a Bluetooth module, a cable modem, and the like.

In the implementation depicted in FIG. 2, console 102 includes a controller support subassembly 240, for supporting four controllers 104(1)-104(4). The controller support subassembly 240 includes any hardware and software components needed to support wired and wireless operation with an external control device, such as a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any one or more of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

To implement one or more method steps, an application 260 comprising machine instructions is stored on hard disk drive 208. When console 102 is powered on, various portions of application 260 are loaded into RAM 206, and/or caches 210 and 212, for execution on CPU 200. Application 260 is described below in more detail. In general, application 260 can include one or more program modules for performing various display functions, such as controlling dialog screens for presentation on a display (e.g., high definition monitor 150), controlling transactions based on user inputs and controlling data transmission and reception between the console 100 and externally connected devices.

Gaming system 100 may be operated as a standalone system by simply connecting the system to high definition monitor 150 (FIG. 1), a television, a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participating component in a larger network gaming community or system, as discussed below in connection with FIG. 4.

Exemplary Computing System

Figure 3:
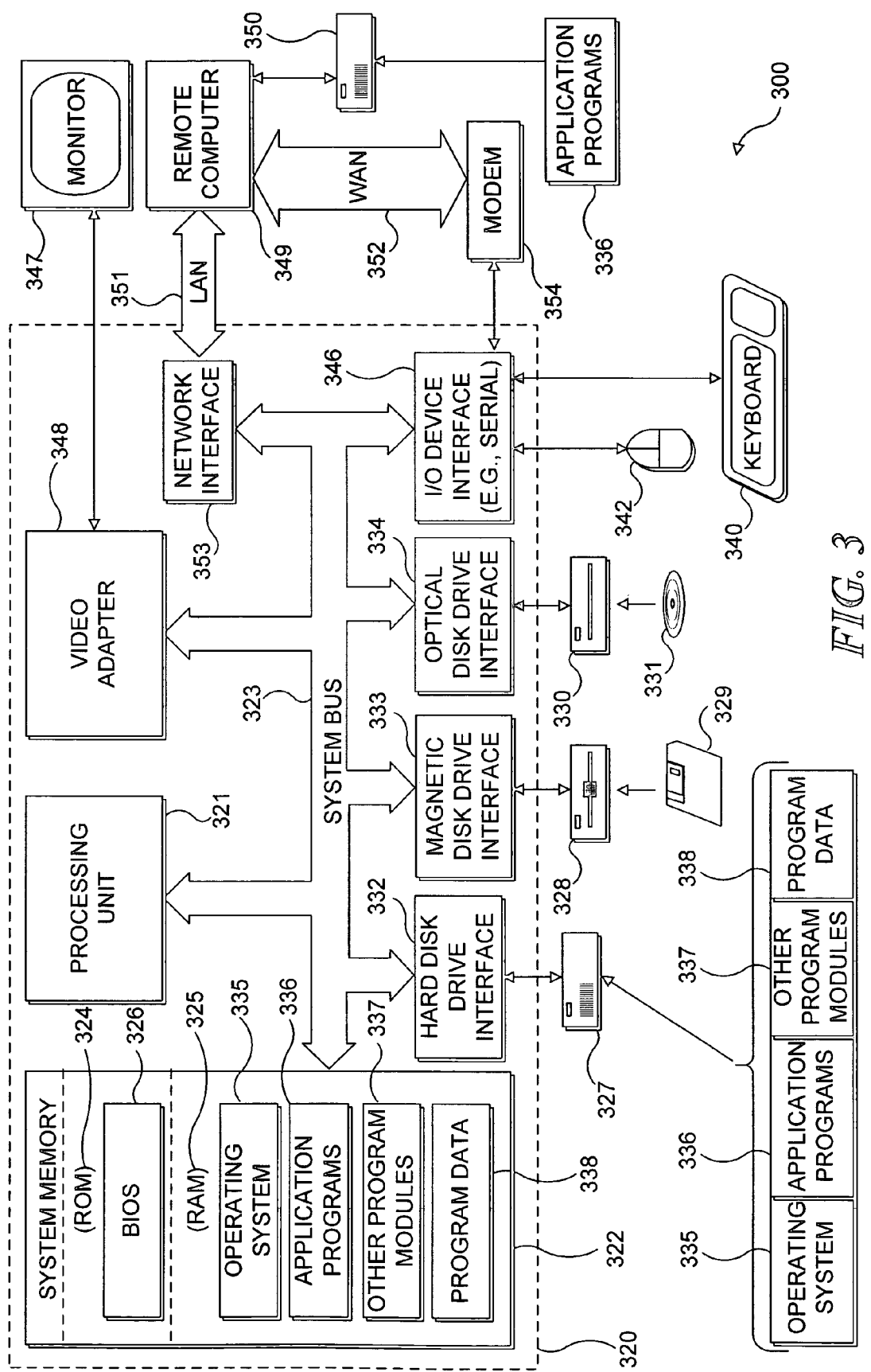
FIG. 3 is a functional block diagram of an exemplary computing system, which is useful for servicing requests in connection with dynamic merchandising, as discussed below.

FIG. 3 is a functional block diagram of an exemplary computing system and/or computer server for serving digital media to the computing device of connected clients, such as gaming and media system 100 or a similar computing system, and for use in implementing parental controls when connected in communication with one or more consoles operated by users. In one or more embodiments, it should be emphasized that only users with specific consoles and/or console service memberships are able to benefit from some of the parental control options provided by the exemplary computing system and/or computer server shown in FIG. 3, since only such users are permitted to connect with the computing system and/or computer server offering the parental control management functions.

The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 3, an exemplary computing system 300 is shown having a general purpose computing device (e.g., a personal computer or PC) 320 that further includes a processing unit 321, a system memory 322, and a system bus 323 that couples various system components, including system memory 322, to processing unit 321. System bus 323 may be any of several types of bus structures including a memory bus or memory controller, a peripheral bus, and a local bus using any of a variety of bus architectures. The system memory includes ROM 324 and RAM 325.

A basic input/output system (BIOS) 326 of fundamental routines that enable the transfer of information between elements within PC 320, such as during start-up, is stored in ROM 324. PC 320 further includes mass storage including a hard disk drive 327, a magnetic disk drive 328 for use with a removable magnetic disk 329, and an optical disk drive 330 for reading from or writing to a removable optical disk 331 such as a CD ROM or other optical media. Hard disk drive 327, magnetic disk drive 328, and optical disk drive 330 are coupled to system bus 323 via a hard disk drive interface 332, a magnetic disk drive interface 333, and an optical disk drive interface 334, respectively. The drives 327, 328, and 330 and their associated computer-readable media provide nonvolatile storage of computer-readable instructions, data structures, program modules, and other data for PC 320. Although the exemplary environment described herein employs a hard disk, a removable magnetic disk 329, and a removable optical disk 331, other types of computer readable media, such as for example, magnetic cassettes, flash memory cards, digital video disks, Bernoulli cartridges, RAMs, ROMs, may also be used in the exemplary operating environment.

A number of program modules can be stored on the hard disk, magnetic disk 329, optical disk 331, ROM 324 or RAM 325, including an operating system 335, one or more application programs 336, other program modules 337, and program data 338. A user may enter commands and information into PC 320 through input devices such as a keyboard 340 and pointing device 342. Other input devices (not shown) may include a microphone, joystick, game controller, satellite dish, scanner, or the like. These and other input devices can be connected to processing unit 321 through a serial port interface 346 that is coupled to the system bus, but can also be connected by other interfaces, such as a parallel port, game port, an IEEE 1394-compliant port, a universal serial bus (USB) or any of a variety of ports compliant with one of several adopted wireless standards (e.g., Bluetooth, IEEE 802.xx, etc). A monitor 347 or other type of display device is also connected to system bus 323 via an interface, such as a video adapter 348. In addition to the monitor, computers can also include other peripheral output devices (not shown), such as speakers and printers.

PC 320 may operate in a networked environment using logical connections to one or more remote computers, such as a remote computer 349. Remote computer 349 may be personal computer, a server, a router, a network PC, a peer device or other common network node, and can include many or all of the elements described above relative to PC 320, although only a remote memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, PC 320 is connected to local network 351 through a network interface or adapter 353. When used in a WAN networking environment, PC 320 typically includes a modem 354 or other means for establishing communications over WAN 352, such as the Internet. Modem 354, which may be internal or external, is connected to system bus 323 via serial port interface 346. In one implementation, PC 320 is a server computer operating in a networked environment, and program modules depicted relative to PC 320, or portions thereof, can be stored in the remote memory storage device 350.

Exemplary Operating Environment

Figure 4:
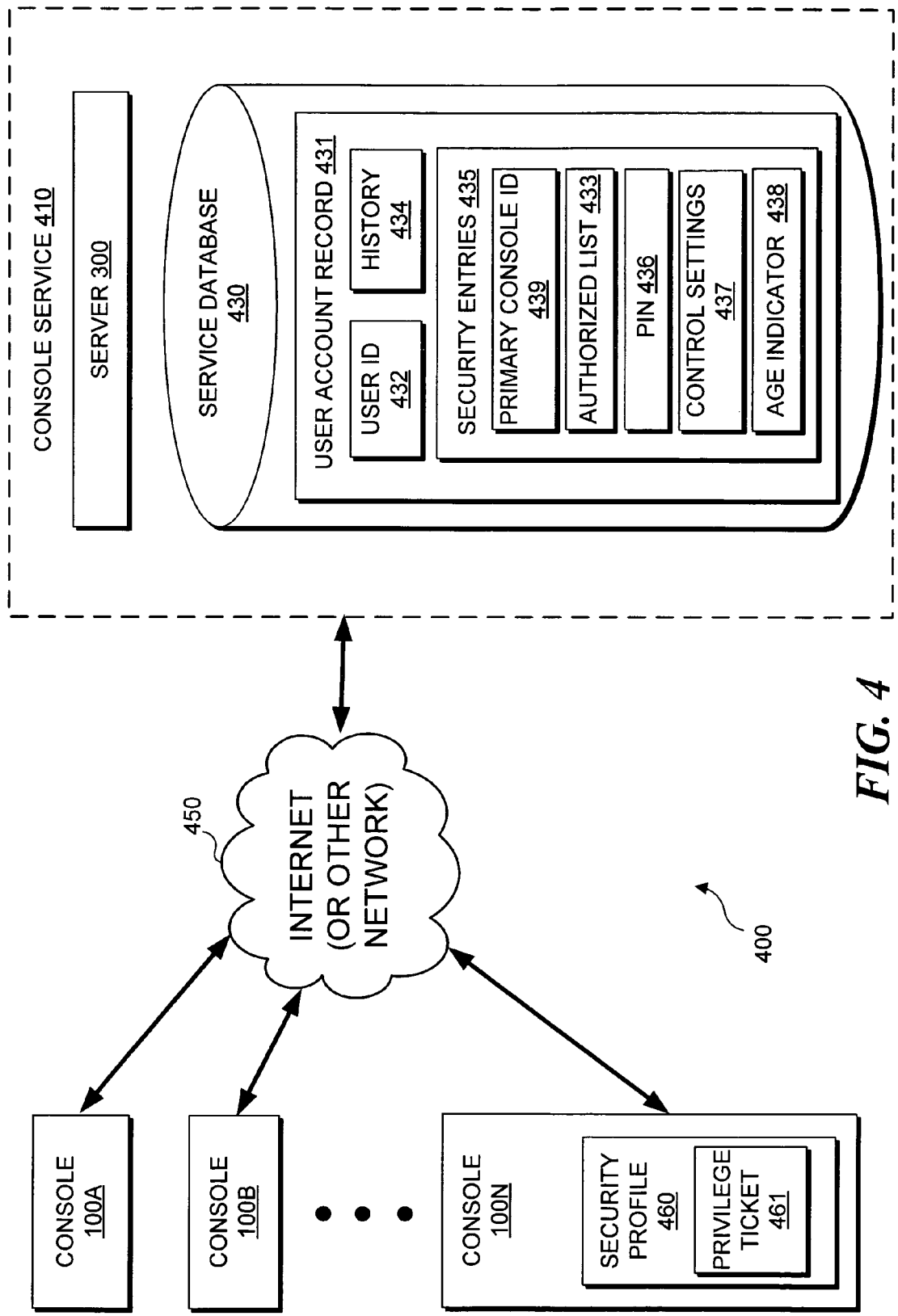
FIG. 4 is a functional block diagram of an exemplary operating environment for a system for dynamically managing user licenses for digital content.

FIG. 4 is a block diagram of an exemplary operating environment 400 for various methods and systems for enabling user specific security settings for enabling parental controls on a media console. FIG. 4 shows a console service 410 in communication with a plurality of consoles 100A-100N via communication system 450. Console service 410 further includes one (or more) server computing system(s) 300 (i.e., only one shown), and a console service database 430. Console service database 430 is shown as including a user account record 431 having a plurality of entries, illustrated again by way of example, as a user history 434, a user identifier (ID) 432, and security entries 435. The security entries 435, include a primary console ID 439, an authorized list 433, a personal identification number (PIN) 436, control settings 437, and an age indicator 438.

In one implementation, each of the plurality of consoles (e.g., each of consoles 100A-100N is a gaming and media system, such as gaming and media system 100 of FIGS. 1 and 2. In general, consoles 100A-100N can be a set of electronic devices that are enabled for communication with console service 410. In one or more implementations, console service 410 is configured to provide dialog screens to a display device to enable interaction with a user. In one or more implementations, consoles 100A-100N are configured to enable transactions with console service 410 using a credit card, a prepaid card, or an electronic user account (e.g., a micro-point balance account). As shown in FIG. 4, console 100N includes a security (or user rights) profile 460. The security profile 460 further includes a privilege ticket 461. In some implementations, privilege ticket 461 includes a plurality of security privilege (or user rights) indicators for providing a security profile for console 100N. The security privilege indicators can be based on one or more security entries 435 from console service database 430, or from other information and selections stored in memory on console 100N. In other implementations, security profile 460 can be used to provide a security configuration for console 100N. A security profile 460 can be included in any console in communication with communication system 450.

Generally, any console of the above-described variety can be configured for on-line and off-line use, such that a user of an off-line console can access local parental controls, and user specific settings stored in memory on the console, for example in a user history file. Furthermore, in an on-line mode, such a console can be configured to request, automatically (or based on a user action), various forms of information from console service 410, including security profile information such as a security privileges ticket. Additionally, console service 410 can be configured to provide security setting related information to the console, periodically or as discrete events, based on various data provided from the console. Console service 410 can also be configured to provide various user dialog screens for enabling a user (with sufficient rights) to interact with the console service to facilitate different functions, such as managing parental controls for a specific user (e.g., a child) of the console.

Communication system 450 can be any communication system configured to communicate signals between consoles 100A-100N and console service 410. In one implementation, communication system 450 is configured as a virtual private network (VPN) that utilizes a secure protocol (e.g., secure socket layer "SSL") to communicate encrypted information through the Internet between consoles 100A-100N and console service 410. In another application, communication system 450 is implemented with calls to dedicated application program interfaces (APIs) using a secure communication protocol that enables closed-network communication between consoles 100A-100N and console service 410. Communication system 450 can thus exclude other general purpose computing devices from communicating with console service 410 through the APIs, so that only consoles 100A-100N are able to participate in the secure connection provided by the console service.

In general, console service 410 comprises any combination of one or more server-side devices and applications or modules configured to facilitate enabling and selecting options for parental controls on a user console. In one implementation, console service 410 includes a server 300 and a console service database 430 in communication with each other. Console service 410 can include additional components or modules that are not relevant to the present discussion, and which are therefore omitted from FIG. 4 for clarity.

Service data base 430 can include one or more relational databases stored in one or more data storage devices (not separately shown in this Figure) at one or more locations. In one embodiment, service database 430 services a plurality of data records, including user account records 431.

User account records 431 can include a variety of information related to each user ID, such as an associated unique identification code or key for each user. A user account record thus associates information related to a specific user ID 432 with other information for that user, such as a user history 434, and a plurality of security entries specific to the user, which can be delivered by console service 410 and applied on any console the user logs on to. The user history 434 can incorporate a record of each product used, purchased, or viewed by the user, the time the user has played a particular game, each movie title the user watched or an identification of each of the CDs the user has played, the online friends with whom the user has interacted, and even a tally of purchased electronic payment units and other financial information associated with a specific subscription-based user account.

Security entries 435 can include a variety of information usable for configuring rental controls on the console, such as those of primary console ID 439, which designates a specific "home" console associated with user ID 432. Other security entries can include an authorized contact list 433, which designates online users who are approved for communicating with the user associated with the user ID. Online friends can include gamer tags, e-mail addresses, and user IDs of other users authorized to communicate with the console through console service 410. In an application, an authorized online friend list can designate those authorized to see the user ID when the user is online, and those who can communicate with the user associated with the user ID.

Exemplary Methods for Enabling User-Specific Security Settings for a Console

Figure 5:
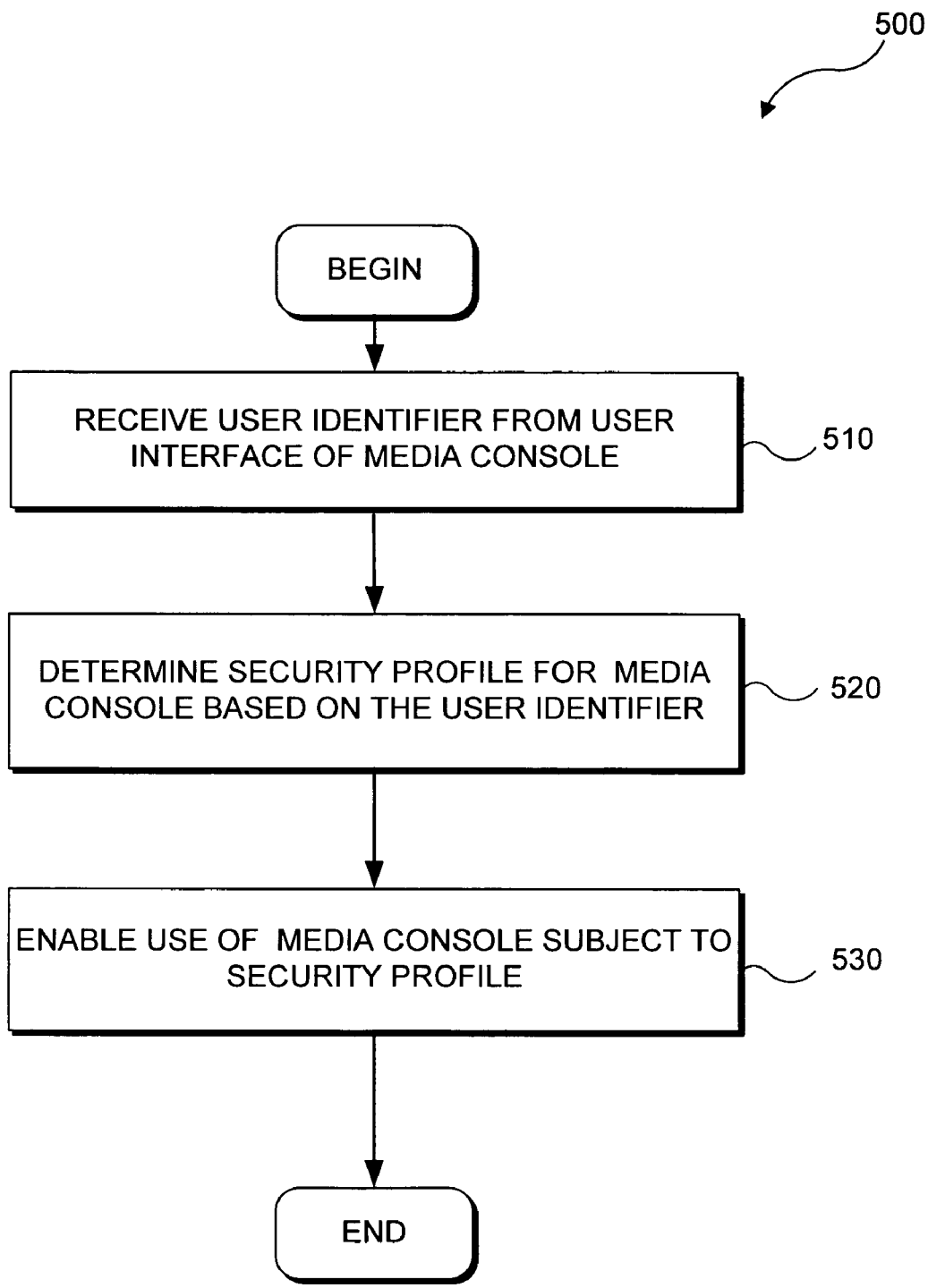
FIG. 5 is a flow diagram illustrating the steps of an exemplary method.

FIG. 5 is a flow diagram illustrating an exemplary method 500. Method 500 can be implemented in some embodiments with components, devices and techniques as discussed with reference to FIGS. 1-4. In some implementations, one or more steps of method 500 are embodied on a computer readable medium containing computer readable code or machine instructions, such that a series of steps are implemented when the computer readable code is executed on a computing device, such as by a processor. In the following description, various steps of method 500 are described with respect to a processor of a user console in a gaming and media system that is performing the method steps, in communication (as appropriate) with a console service. In some implementations, certain steps of method 500 can be combined, and performed simultaneously or in a different order, without deviating from the objective of method 500 or without producing different results. Method 500 begins at a step 510.

In step 510, a first user identifier is received from a user interface of a media console. The user identifier can be received at any time that a console user interface is enabled to receive a user identifier. In an alternative embodiment, which can also be embodied in a computer-readable medium, a personal identification number received from a user interface is identified. In this embodiment, the personal identification number can be associated with a supervising user, such as a parent. In another embodiment, the console can be configured to receive a personal identification number (PIN), when the console is off-line. In yet another implementation, the media console can be configured to prompt the user for a PIN in order to grant access to select or edit the security controls (if the PIN corresponds to a user with such permissions).

In a step 520, a first security profile is determined for the media console based on the user identifier. The security profile can define a supervised operating configuration for the media console that is specific to the user identifier. In one implementation, the security profile is determined by first accessing a user account record at a console service. In this implementation, the user account record can be associated with the user identifier and can include at least one security related entry. A security privilege ticket can then be obtained from the console service. In this implementation, the security privilege ticket can be based on the user account record and can include a plurality of console security privilege indicators. An alternate embodiment includes determining a security configuration for the media console based on the PIN that was identified in the alternate embodiment of step 510. In this implementation, the security configuration defines a plurality of operational settings for the media console that are specific to the PIN, and thus, specific to the corresponding user.

Another implementation further includes determining whether more than one user is using the media console, and whether use of the media console by a second user is subject to a second security profile. In this implementation, a second user identifier can be identified that corresponds to the second user, as well as to a second security profile having a second plurality of console security privilege indicators corresponding to the first plurality of console security privilege indicators. Next, each console security privilege indicator of the first security profile can be compared with each corresponding console security privilege indicator of the second security profile. An aggregate security profile then can be generated based on the comparison of the first security profile and the second security profile. In this implementation, the more restrictive of each corresponding console security privilege indicator is selected from the first and second pluralities of the first and the second security profiles. Finally, use of the media console is enabled subject to the aggregate security profile. In this implementation, the aggregate security profile can supersede the security profiles associated with the first user identifier and the second user identifier. In this manner, the most restrictive security privileges from one or more user security profiles can be combined so that a user with limited privileges (e.g., such as a young child) on a multi-user console retains limited privileges even when players with no restrictions (e.g., a visiting friend or an adult) are logged onto the same media console. In one implementation, a first user identifier can be a roaming user having restrictive privileges that will be implemented when the user logs on a visiting console that is online. In this implementation, the visiting user's privileges can be aggregated with other players on that console.

Yet another implementation includes generating a first user history associated with the first user identifier. In this implementation, the user history enumerates each activity performed on the console while the media console is enabled subject to the first security profile associated with the first user. The user history can then be stored at the media console in a record that associates that first user history with the first user identifier. Another implementation includes providing the stored user history to the console service when the first media console is enabled for online communication. In this implementation the user history can be associated with a user account record associated with the first user identifier.

Still another implementation provides for determining if a second user identifier grants authorization to manage user-specific security settings for the media console and for the first user identifier. In this implementation the second user identifier can be the identifier of a parent, for example. The second user identifier can then be provided access to a security controls dialog screen based on an affirmative determination of proper authority. In this manner, management of user-specific security settings can be enabled for the first security profile. In another embodiment of this implementation, the security controls dialog screen can provide a selection of user-specific security setting controls for offline media console use. The settings can include controls for configuring permission to access media based on a media rating, for configuring an online service account, for configuring access to an online service, and for configuring access to legacy games.

In yet another embodiment of this implementation, the security controls dialog screen can provide a selection of user-specific security setting controls for online console use. The settings can include controls for configuring an authorized contact list, for configuring a personal information shield, and for configuring permission for online purchases. The settings can also include controls for configuring a time limit for media console use, for configuring permission to access user created content, for configuring permission to access media based on a local media rating system, and for auditing a user history. One implementation includes enabling the second user identifier to access the security controls dialog screen over the Internet via a console service web page. In this manner, and authorized user such as for example a parent can manage console controls and audit console use by a child from a computer or another console over the Internet.

In step 530, use of the media console is enabled subject to the first security profile. In some implementations, the first security profile establishes a parental control on the use of the first media console by the first user. For example, in this implementation the first user can be a supervised user such as a child. The media console can be enabled subject to the security profile at any time after the security profile has been determined, as in step 520. An alternative embodiment includes applying the security configuration determined in the alternate embodiment of step 520 to the media console for as long as the corresponding user is using the media console. Another implementation operative with this alternative embodiment includes further requesting a security configuration ticket from a console service. In this implementation, the request for the security configuration ticket can include the PIN and a media console identifier corresponding to the media console. A user account record then can be accessed at the console service. In this implementation of the alternate embodiment, the user account record can be associated with the PIN and can include one or more security related entries. Finally, a security configuration ticket can be obtained from the console service. In this particular implementation, the security configuration privilege ticket can be based on the user account record and can include a plurality of operational setting indicators. In yet another implementation of the above alternate embodiment, it can be determined if the PIN grants authorization to manage user security settings for the media console based on the user identifier, and if so, access to a security controls dialog screen can be provided to enable modification of operational settings for the security configuration.

In some embodiments, the first security profile can include one or more predetermined default security indicators which can be automatically selected based on a user age indicator that is associated with the first user identifier. In this manner, a console can be automatically configured with security settings even when no security settings have been selected by an authorized party. This particular implementation can be a default mode for a new console where the purchaser has provided information for a user account including the age of one or more intended users of the console.

Still another implementation includes masking the supervised operating configuration enabled by a security profile, so that the media console is visible online only to a person on an authorized online contacts list, and communications directed to the media console that are not from a person on the authorized online contact list are refused for as long as use of the media console is subject to the security profile. In this manner, a user, such as a child, can be protected from exposure to personal data trolling and unwanted communication from unknown online parties.

In one implementation, the first security profile defines an access permission level for communication with online contacts. In this implementation, the permission level can be selected to provide unrestricted online contact communication access, no online contact communication access, or restricted online contact communication access, based on a predefined authorized contacts list.

Figure 6:
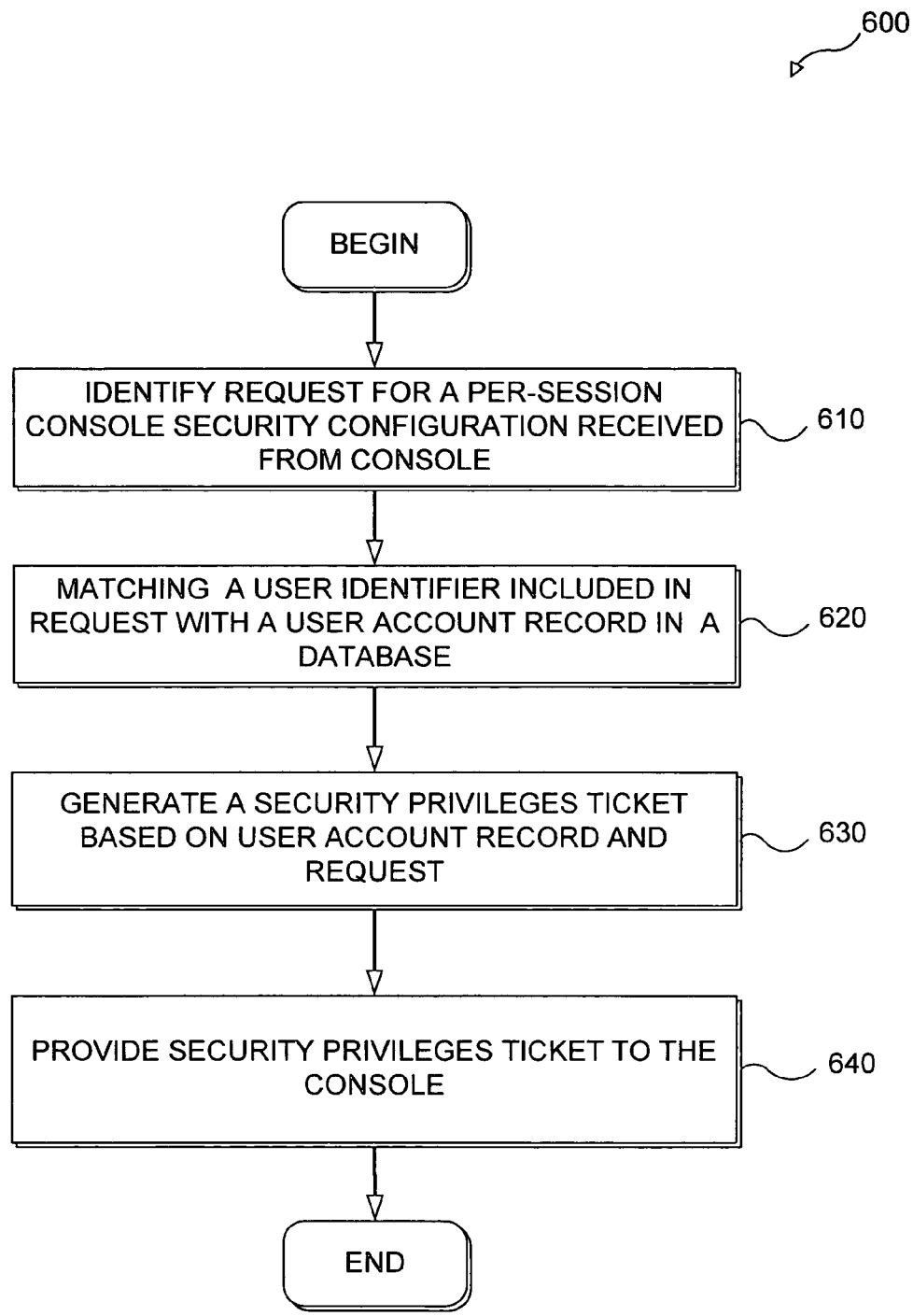
FIG. 6 is a flow diagram illustrating the steps of another exemplary method.

FIG. 6 is a flow diagram illustrating another exemplary method 600. Method 600 can be implemented in some embodiments with components, devices, and techniques as discussed with reference to FIGS. 1-4. In some implementations, one or more steps of method 600 are embodied on a computer readable medium containing computer readable code or machine instructions such that a series of steps are implemented when the computer readable code is executed by a processor. In the following description, various steps of method 600 are described with respect to one or more console service processors performing the method steps. In some implementations, certain steps of method 600 can be combined, performed simultaneously, or in a different order, without deviating from the objective of method 600 or without producing different results. Method 600 begins at a step 610.

In step 610, a request for a per-session console security configuration received from a first console is identified. In some implementations, the request can include a first user identifier and a first console identifier. In one implementation, the request can be identified at any time after the request is received to a console service. In one implementation, a per-session console security configuration is a security profile that can be implemented for a logon session for a particular user (e.g., a period after which the particular user has logged on and prior to the user logging off of a specific online console), such as the user identified by the first user identifier.

In step 620, the first user identifier is matched with a first user account record in the database in response to identifying the request. The user account record can include a primary console identifier associated with the first user identifier and at least one security related entry. In some implementations, the security related entry can be a PIN, a console control configuration setting, and an age indicator. In other implementations, the security related entry can be a predefined authorized contacts list and primary console identifier. Generally the primary console identifier is associated with a "home" console that the user associated with the user identifier uses most.

In other implementations, the console control configuration setting can be an indicator that unrestricted online contact communication access is permitted, an indicator that no online contact communication access is permitted, or an indicator that restricted online contact communication access is permitted based on the predefined authorized contacts list. In still other implementations, the console control configuration setting can be one or more of an indicator that enables a personal information shield, an indicator that sets a permission level for online purchases, and an indicator that sets a time limit for media console use. In other implementations, the console control configuration setting can be one or more of an indicator that restricts permission to access user-created content, an indicator that sets a permission level for accessing media based on a local media rating system, and an indicator that sets permission to audit a user history.

In a step 630, a security privileges ticket is generated based on the user account record and the request. In some implementations, the security privileges ticket can include a plurality of console security configuration indicators. In one implementation, the security privileges ticket is embodied in a data structure, (e.g., a 16, 32, 64, 128, etc. bit word), having a plurality of binary flags corresponding to the one or more console security configuration indicators. In another implementation, the security privileges ticket can be embodied in a private key signed data structure that includes a user identifier, a console identifier, and a plurality of data records corresponding to one or more console security configuration settings.

In a step 640, the security privileges ticket is provided to the requesting console. In some implementations, the security privileges ticket can be provided to the console that any time after the ticket is generated. In other implementations, the security privileges ticket can be provided to the requesting console subject to ordering within a privileges ticket queue.

Another implementation includes identifying console security data received from the first user console. In this implementation, the console security data can include user history and at least one console control configuration setting. The received console configuration data can then be associated with the first user account record. In this manner, security selections made by an authorized user can be stored to a user account record, and a user history can be monitored by the authorized user by accessing the user account record from a computer or a console. Additionally, the security entries stored to a user account record enable a user to roam from their "home" console (e.g., the console associated with the primary console identifier), while retaining the security profile set up for them by a parent or other authorized party.

Yet another implementation includes detecting a request for access to the first user account record from a Web portal. In this implementation, the request can include a second user account identifier associated with a second user. In some implementations, the second user account identifier is an authenticated online service identifier. Examples of authenticated online services include for example a Microsoft Passport, or a VeriSign™ or other digital signature certification authority (CA). Next, it can be determined if the second user identifier is authorized to manage the first console security configuration, and if so, access is provided to a console security configuration dialog screen to enable the second user to manage the first console security configuration. In this implementation, a console service can provide support for a Web portal.

Exemplary Dialog Screens

FIGS. 7-15 graphically illustrate, through exemplary dialog screens, some interactions of the system, components, and method described in reference to FIGS. 1-6. The following description and corresponding Figures are meant only to serve as illustrative dialog screens that aid in understanding certain functionality, but are in no way intended to represent all possible combinations of dialog screens or of possible uses of the described system and method.

Figure 7:
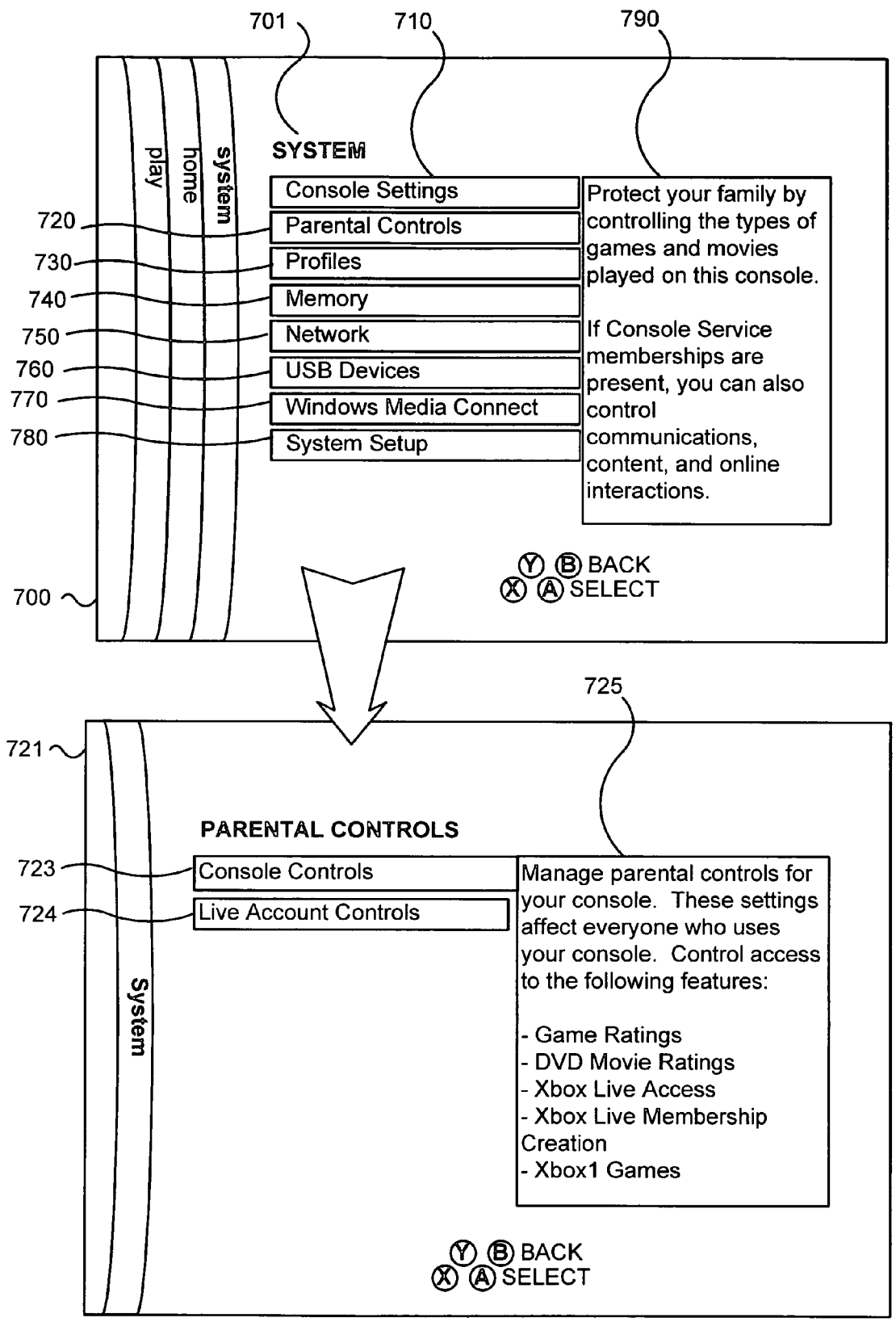
FIG. 7 is a schematic diagram of an exemplary graphical user interface dialog screen.

FIG. 7 illustrates an exemplary main dialog screen 700 for managing security controls (e.g., parental controls). The main dialog screen illustrates menu options from which a user can select using a user input device at a console or other computing device. In the example shown, main dialog screen 700 includes options for "Console Settings" 710, a "Parental Controls" option 720, a "Profiles" option 730, a "Memory" option 740, a "Network" option 750, "USB Devices" option 760, a "Windows Media Connect" option 770, and a "System Setup" option 780, which can enable the user to navigate to other dialog screens and to make other console security selections. Additional information about the options a menu selection provides can be presented in a graphical window 790. Generally, a menu item can be invoked by selecting a field of the desired menu item. A dialog screen 721 of FIG. 7 represents an exemplary "Parental Controls" screen that can be presented in response to a user invoking the "Parental Controls" menu item in main dialog screen 700. As illustrated in FIG. 7, a dialog screen 721 can include additional menu selections for a "Console Controls" option 723 and a "Live Account Controls" option 724. A graphical window 725 can include information about the menu options. As depicted in FIG. 7, graphical window 725 includes information concerning "Console Controls" option 723.

Figure 8:
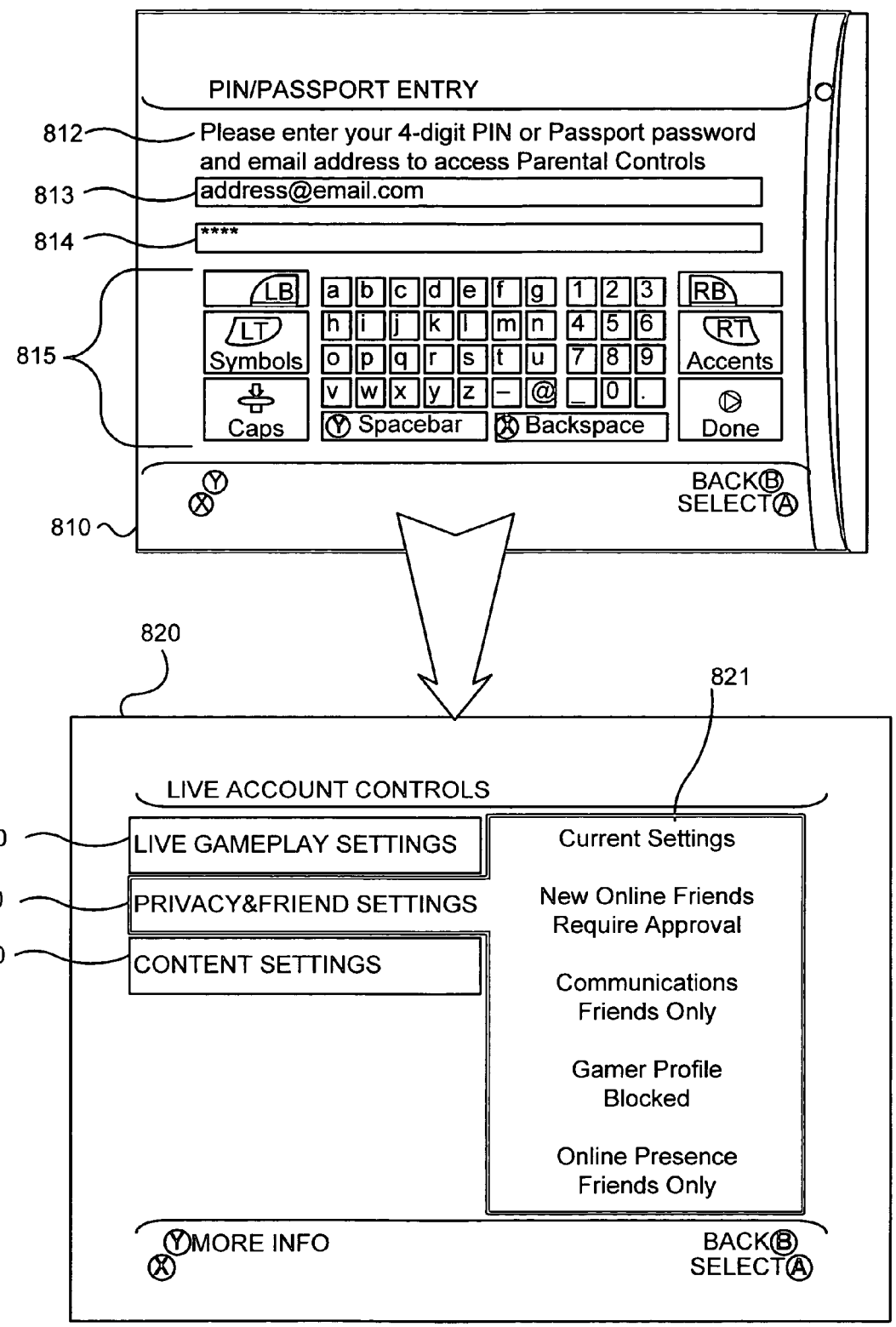
FIG. 8 is a schematic diagram of another exemplary graphical user interface dialog screen.

By way of further illustration, FIG. 8 is a schematic diagram of another exemplary graphical user interface dialog screen 810, which represents a dialog screen that can be presented in response to a user invoking "Live Account Controls" option 724 as shown in FIG. 7. Dialog screen 810 is a password-type screen that includes a prompt message 812 to enter a PIN, or alternatively third-party verifiable online information, such as a Microsoft Passport in a password/PIN field 814 and/or an e-mail address field 813. A series of user entry buttons 815 is provided that a user can select using a user input device at a console or other computing device to provide a PIN, a password, an email address, and other information. Generally, dialog screen 810 can be presented to a user to control access to various security settings in one or more additional dialog screens, which ensures that only an authorized party is able to manage security settings for one or more specific users (or all users) of a media console. If an incorrect password or PIN is entered by a user, an error screen can be presented (not shown) and access to various console security settings will not be allowed.

Figure 9:
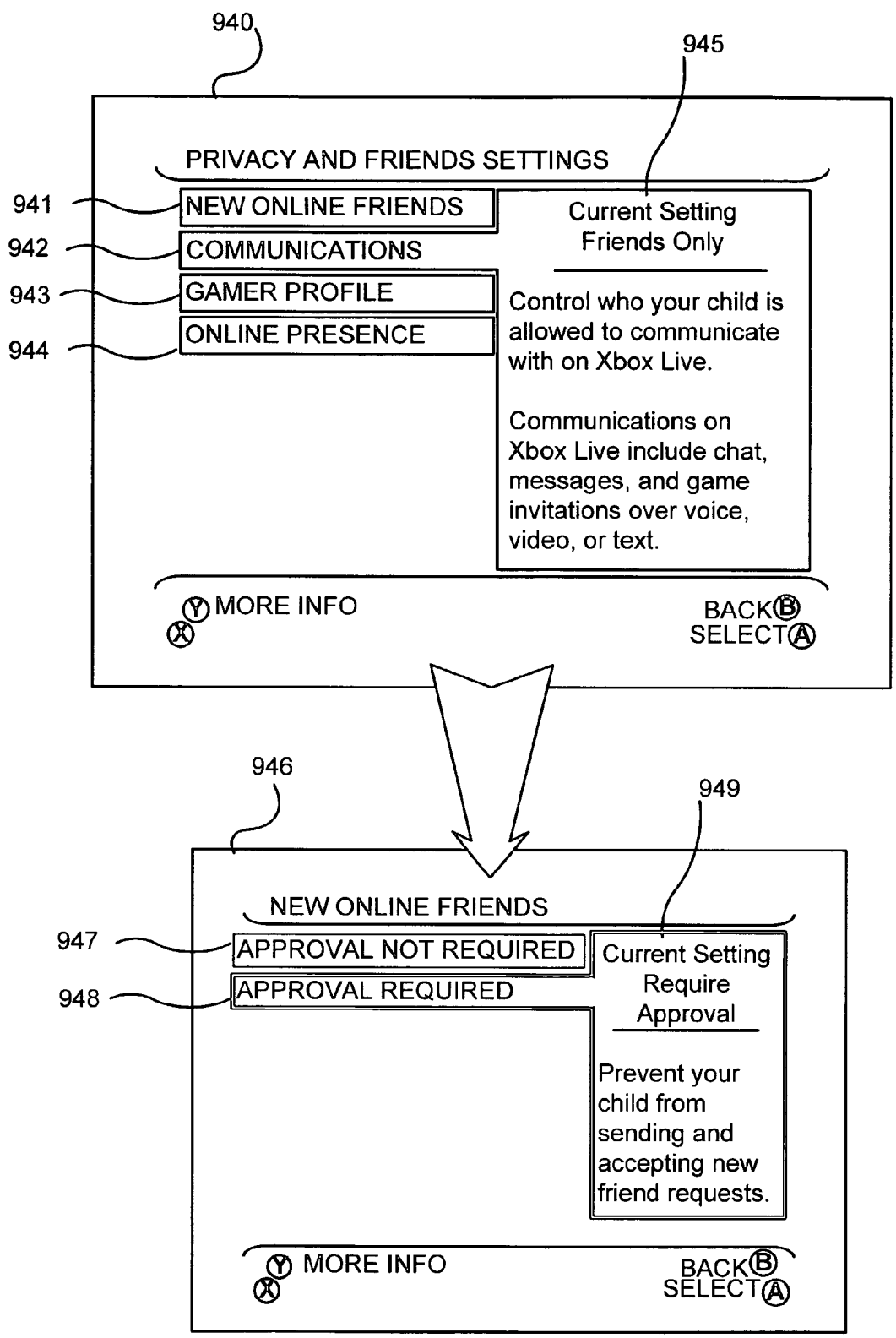
FIG. 9 is a schematic diagram of yet another exemplary graphical user interface dialog screen.
Figure 10:
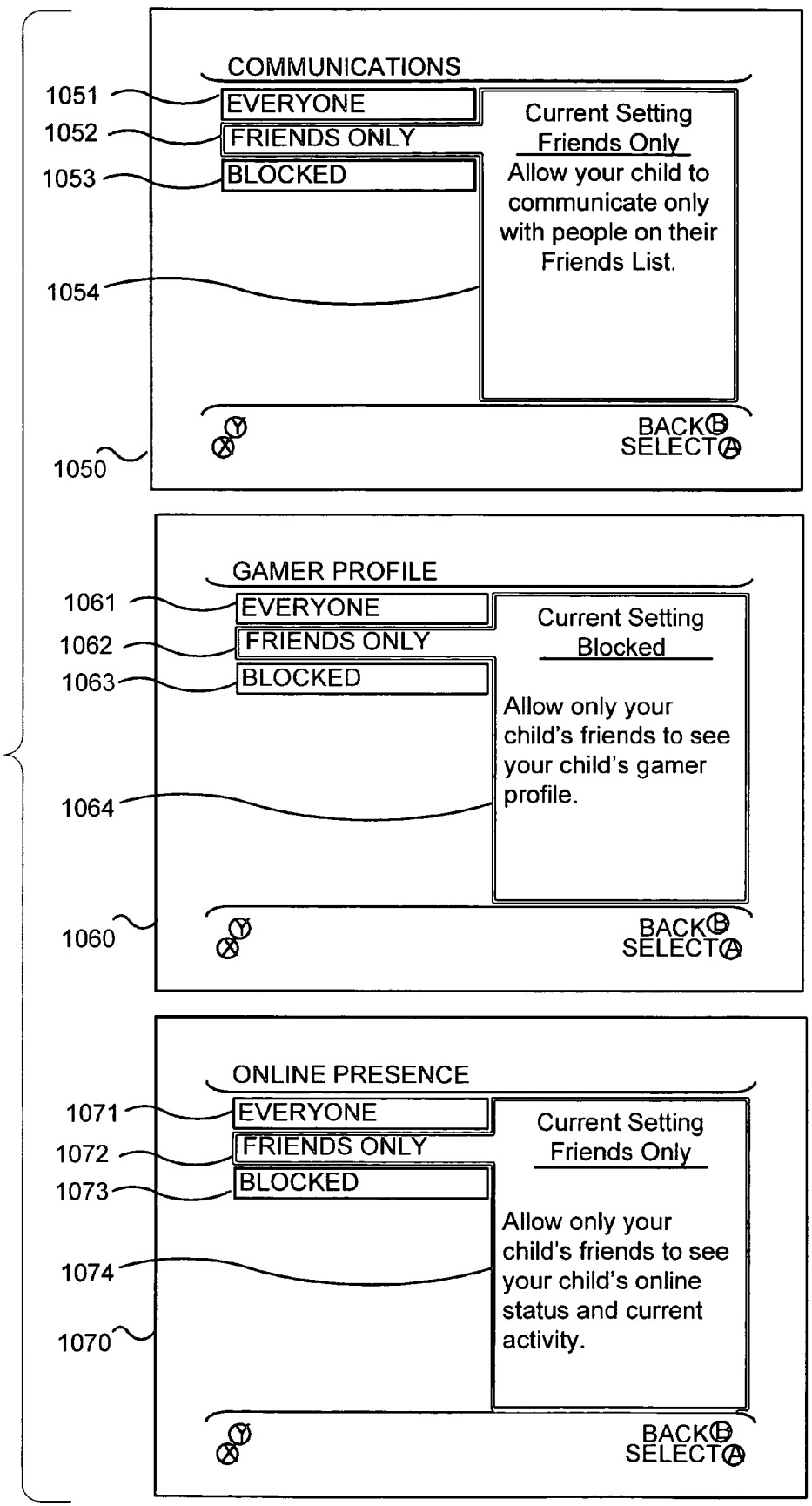
FIG. 10 is a schematic diagram of still another exemplary graphical user interface dialog screen.

A dialog screen 820 of FIG. 8 represents a "Live Account Controls" dialog screen that can be presented to a user after an approval of a logon sequence that is initiated by dialog screen 810. In the example shown, dialog screen 820 includes menu selections for "Live Game Play Settings" 830, "Privacy and Friends Settings" 840, and "Content Settings" 850. An information window 821 is shown illustrating options of "Privacy and Friends Settings" 840, which is shown highlighted. In some implementations, the information window illustrates the options that are available when the highlighted menu option is invoked. For example, FIG. 9 illustrates a "Privacy and Friends Settings" dialog screen 940 that includes menu options for "New Online Friends" 941, "Communications" 942, "Gamer Profile" 943, and "Online Presence" 944, each of which corresponds to one of the options shown in the information window the 821 in dialog screen 820 of FIG. 8. An information window 945 provides information about the current setting and about the permission granted by the current highlighted selection, "COMMUNICATIONS" setting 942. Accordingly, a dialog screen 946 can be invoked by selecting "New Online Friends" 941 on dialog screen 940. Dialog screen 946 further offers menu options for an "APPROVAL NOT REQUIRED" setting 947 and an "APPROVAL REQUIRED" setting 948. An information window 949 provides information about the current setting and about the permission granted by the current highlighted selection, "APPROVAL REQUIRED" setting 948. In general, new online friends are online contacts that are approved for communicating with a user. Dialog screen 946 can be used to generate an approved online contact list (e.g., the entries in the user's friends list).

A dialog screen 1050 is an example of a dialog screen that can be invoked by selecting "Communications" 942 option of FIG. 9. Dialog screen 1050 includes selections for "EVERYONE" 1051, "FRIENDS ONLY" 1052, and "BLOCKED" 1053. An information window 1054 provides information about the current setting, and the currently highlighted menu selection. As illustrated in the Figure, is "FRIENDS ONLY" 1052 is selected, the user is only enabled to communicate with people on their approved friends list.

A dialog screen 1060 is an example of a dialog screen that can be invoked by selecting "GAMER PROFILE" option 943 of FIG. 9. Dialog screen 1060 includes selections for "EVERYONE" 1061, "FRIENDS ONLY" 1062 and "BLOCKED" 1063. An information window 1064 provides information about the current user setting and the highlighted selection. As illustrated in the Figure, a "FRIENDS ONLY" 1062 selection allows only people on the user's approved friends list to see a user's gamer profile.

A dialog screen 1070 is an example of a dialog screen that can be invoked by selecting "ONLINE PRESENCE" option 944 of FIG. 9. Dialog screen 1070 includes selections for "EVERYONE" 1071, "FRIENDS ONLY" 1072, and "BLOCKED" 1073. An information window 1074 provides information about the current user setting and the highlighted selection. As illustrated in the Figure, a "FRIENDS ONLY" 1072 selection for this dialog screen enables only approved online friends to see when the selected user is active online.

Figure 11:
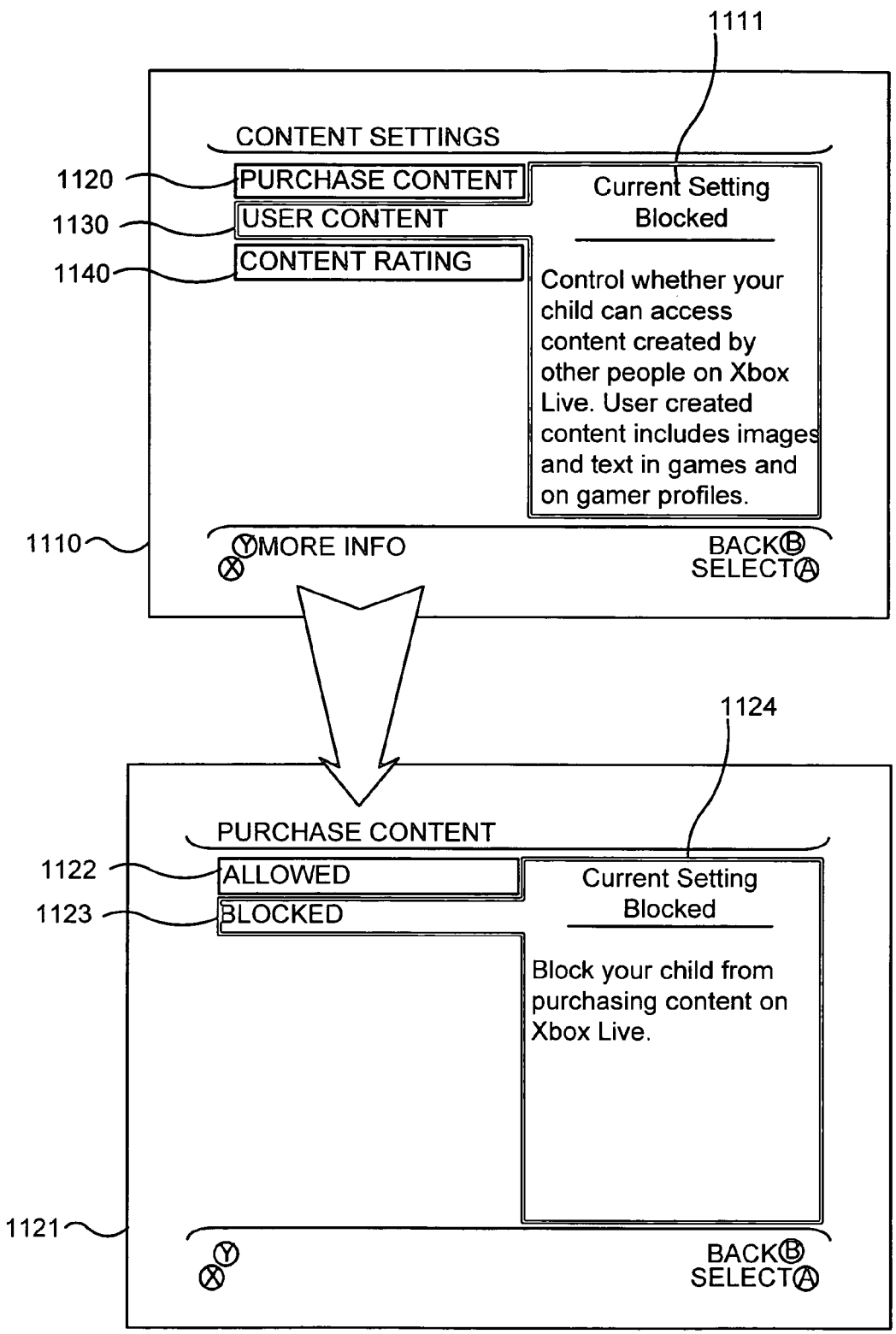
FIG. 11 is a schematic diagram of another exemplary graphical user interface dialog screen.

By way of further illustration, FIG. 11 includes an exemplary dialog screen 1110 that can be invoked by selecting "Content Settings" 850 in dialog screen 820, as illustrated in FIG. 8. Dialog screen 1110 includes menu selections "PURCHASE CONTENT" 1120, "USER CONTENT" 1130, and "CONTENT RATING" 1140. An information window 1111 provides information about the current user setting and the highlighted menu option. As illustrated in the Figure, several security controls may be implemented using dialog screen 1110, including restricting access to user-created content, determining whether a user may purchase content, or restricting access to content based on a rating system. For example, a user dialog screen 1121 can be invoked by selecting "PURCHASE CONTENT" 1120 on dialog screen 1110.

Figure 12A:
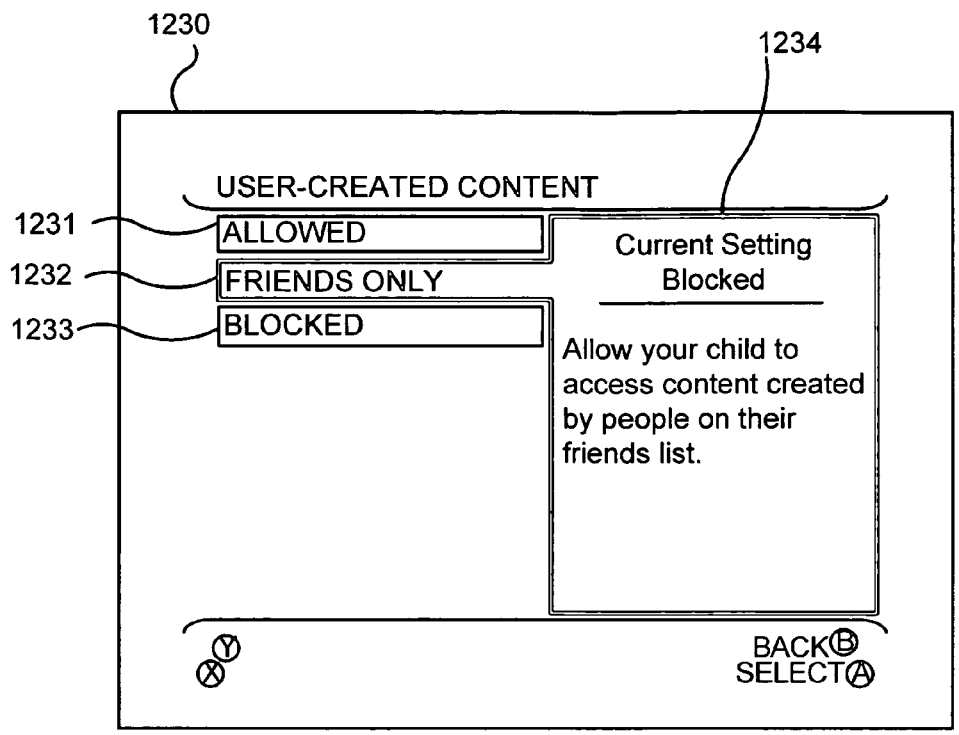
FIG. 12A is a schematic diagram of yet another exemplary graphical user interface dialog screen.

User dialog screen 1121 includes menu selections for "ALLOWED" 1122, and "BLOCKED" 1123. An information window 1124 provides information about the current user setting and a current highlighted menu selection. As illustrated in the Figure, a selected user can be blocked from making online purchases from a media console. Similarly, FIG. 12A illustrates an exemplary dialog screen 1230 that can be invoked by selecting "USER CONTENT" 1130 on dialog screen 1110 of FIG. 11. User dialog screen 1230 includes menu selections for "ALLOWED" 1231, "FRIENDS ONLY" 1232, and "BLOCKED" 1233. An information window 1234 provides information about the current user setting and a current highlighted selection of dialog screen 1230. As illustrated in the Figure, a selected user can be blocked from accessing content created by another user, such as game levels, avatars, animations and graphics, music, and other media files. A restriction on user-created content can apply to all users of a console, or can apply only to a specific user, based on the configuration of the media console.

Figure 12B:
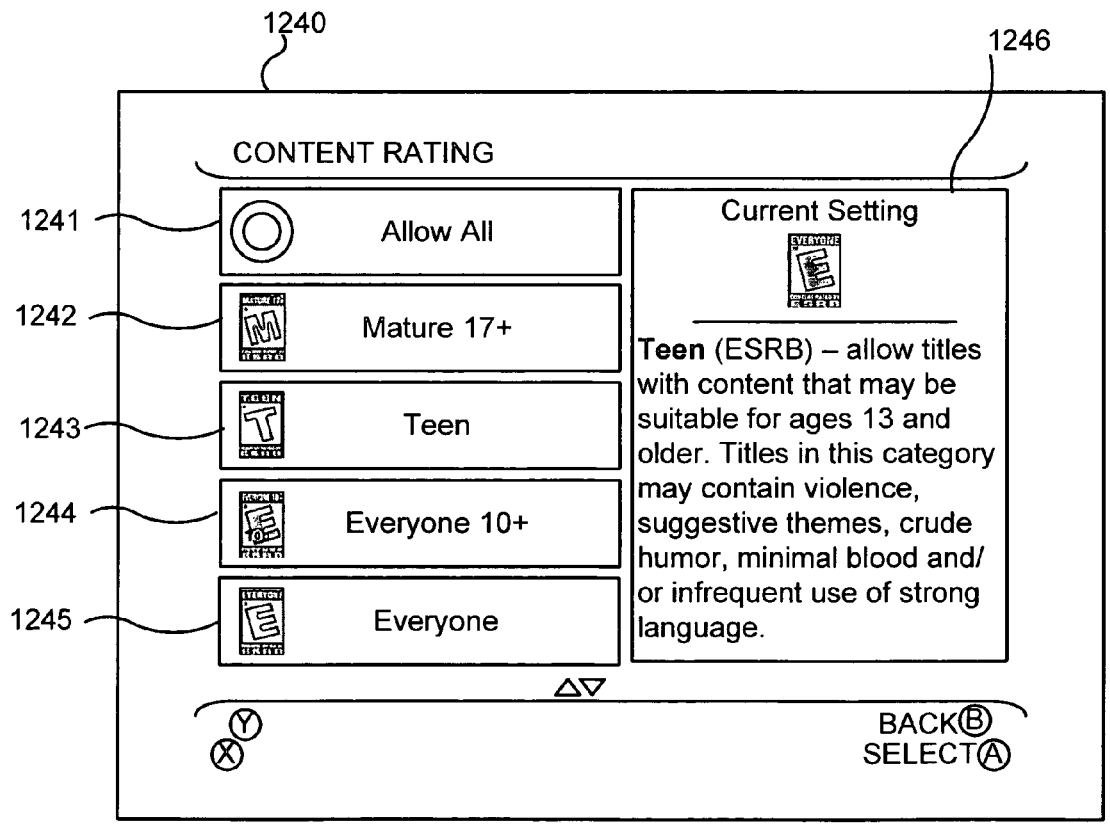
FIG. 12B is a schematic diagram of still another exemplary graphical user interface dialog screen.

FIG. 12B further illustrates an exemplary dialog screen 1240 that can be invoked by selecting "CONTENT RATING" 1140 on dialog screen 1110 of FIG. 11. User dialog screen 1240 includes menu selections for "Allow All" 1241, "Mature 17+" 1242, "Teen" 1243, "Everyone 10+" 1244 and "Everyone" 1245. An information window 1246 provides information about the current user setting and the current highlighted selection for a rating level. As illustrated in the Figure, user access to content such as games and music can be controlled based on a content rating. A content rating selection can apply to all users of a console, or can just apply to a specific user, based on the configuration of the media console.

Figure 13:
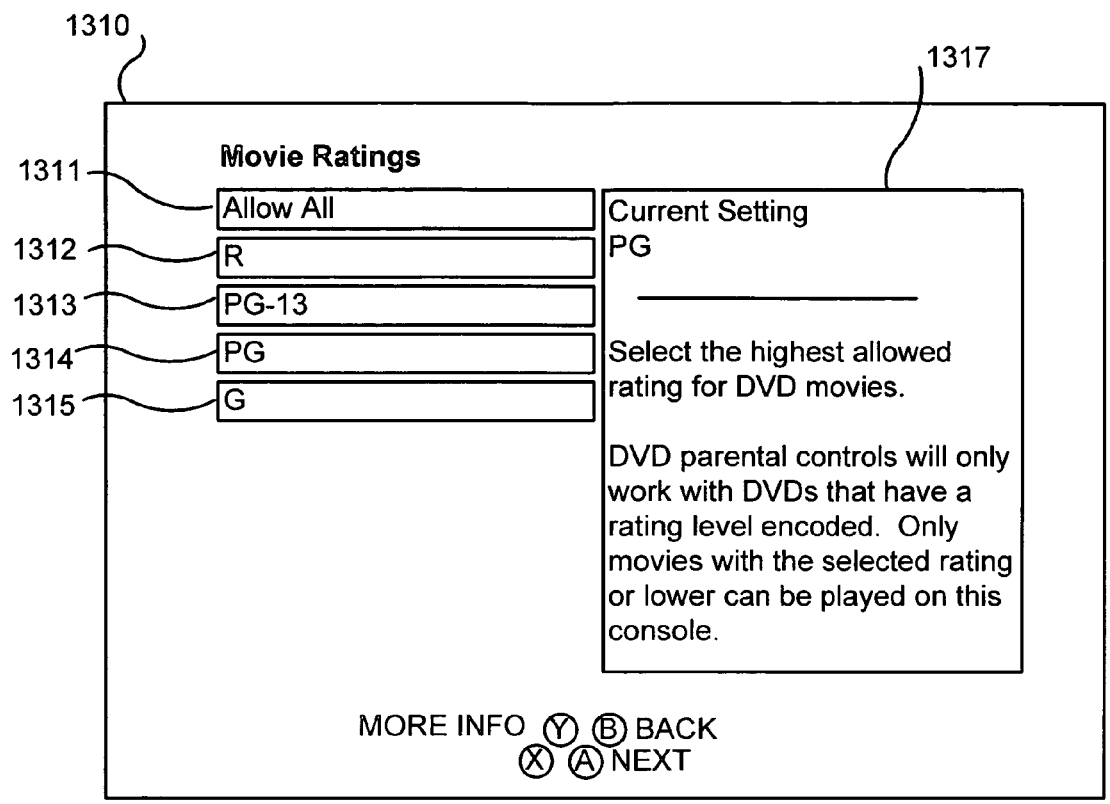
FIG. 13 is a schematic diagram of another exemplary graphical user interface dialog screen.

FIG. 13 illustrates an exemplary user dialog screen 1310 for the specific case of enabling content control based on movie ratings. Menu options are provided by dialog screen 1310 for "Allow All" 1311, "R" 1312, "PG-13" 1313, "PG" 1314, and "G" 1315. An information window 1317 provides information about the current user setting and current highlighted selection of dialog screen 1310. The movie rating selection can apply to all users of a console, or can apply only to a specific user, based on the configuration of the media console.

Figure 14:
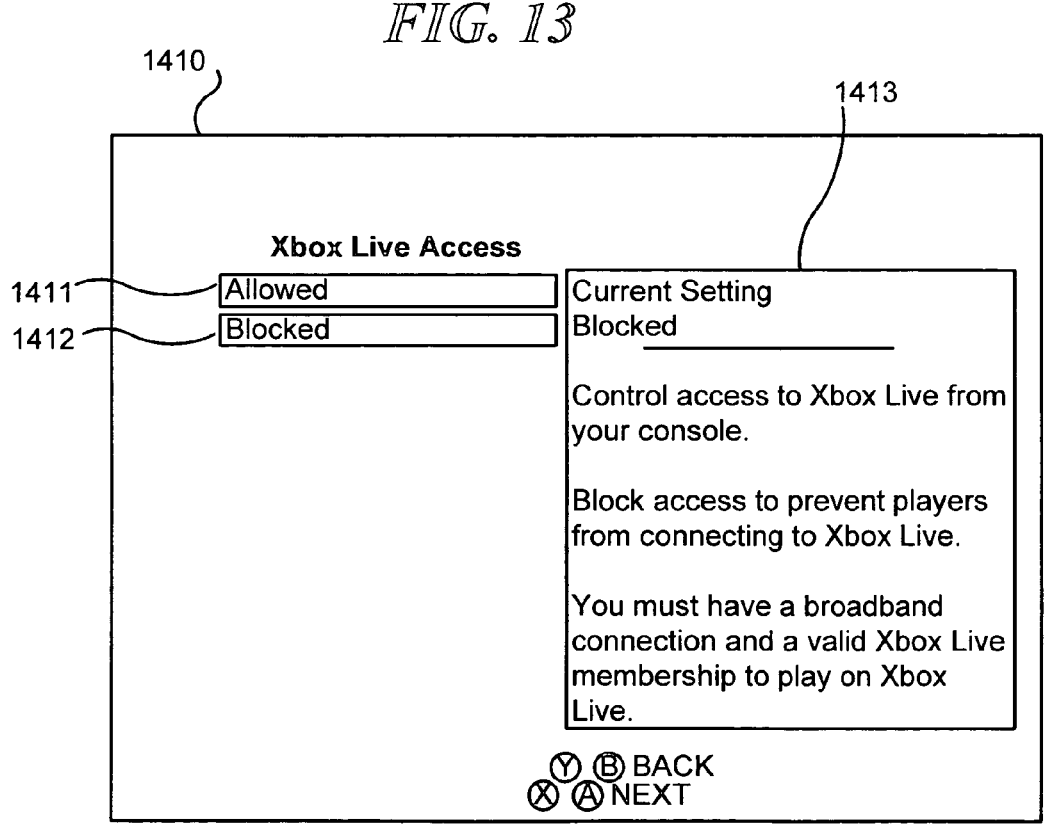
FIG. 14 is a schematic diagram of yet another exemplary graphical user interface dialog screen.

By way of further example, FIG. 14 illustrates another exemplary dialog screen 1410. As shown in the Figure, a dialog screen 1410 controls access to an online service (e.g., the Xbox LIVE™ service). Dialog screen 1410 includes menu options for "Allowed" 1411, and "Blocked" 1412. An information window 1413 provides information about the current user setting and the current highlighted selection of dialog screen 1410. As illustrated in the Figure, access to an online console service can be managed for all users of a console, or for only a specific user, depending on the selected options.

Figure 15:
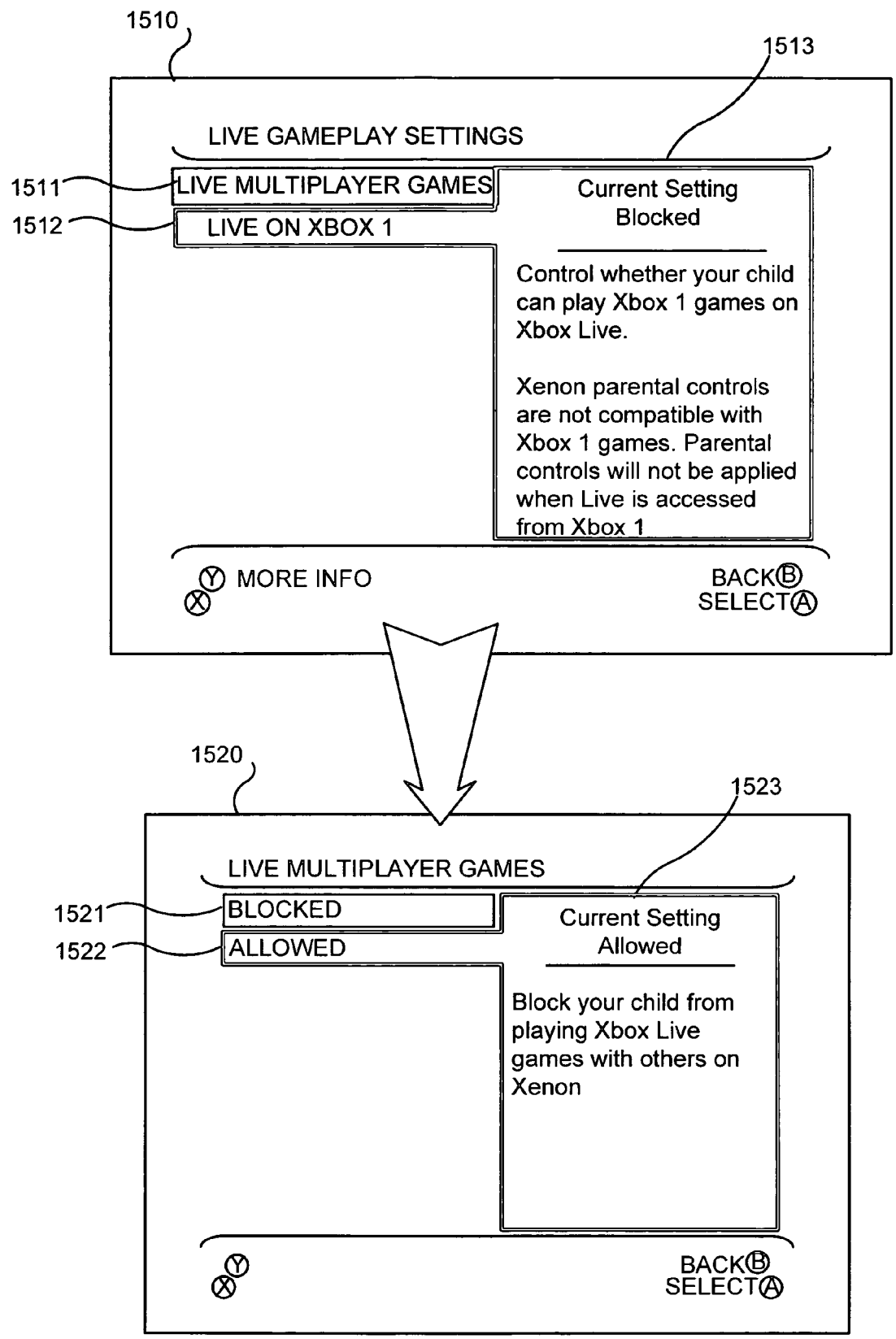
FIG. 15 is a schematic diagram of still another exemplary graphical user interface dialog screen.

By way of yet another illustration, FIG. 15 illustrates an exemplary dialog screen 1510 for managing online game playing settings. As illustrated in the Figure, dialog screen 1510 includes menu selections for "LIVE MULTIPLAYER GAMES" 1511, and "LIVE ON XBOX 1" 1512. An information window 1513 provides information about the current user setting and the current highlighted selection of dialog screen 1510. As illustrated in the Figure, user access to online game playing through a console service can be managed for all users of a console or only for a specific user, depending on the selected options. For example, when "LIVE MULTIPLAYER GAMES" 1511 is selected, a dialog screen 1520 can be invoked to offer menu options "BLOCKED 1521, and "ALLOWED" 1522 to control user access to online multiplayer games. Information window 1523 provides information about the current user setting and the current highlighted selection of dialog screen 1520. Similarly, access to legacy games that may not have certain ratings controls can be managed by invoking "LIVE ON XBOX 1" 1512 in dialog screen 1510.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer-implemented method for enabling user-specific security settings for a media console to enable parental control, the method comprising:

establishing a plurality of security profiles by displaying a main dialog screen and receiving input from the main dialog screen for managing security controls, the main dialog screen comprising options for console settings, parental controls, profiles, memory, network, USB devices, media connect, and system setup, each option enabling a user to navigate to at least one other dialog screen associated with the each option;

receiving a first user identifier from a user interface of a first media console;

determining a first security profile for the first media console based on the first user identifier, the first security profile defining a supervised operating configuration for the first media console that is specific to the first user identifier, the operating configuration comprising a permission level for online purchases, a time limit for media console use, and a control of online contact access; and enabling use of the first media console subject to at least the first security profile, wherein the first security profile establishes a parental control on the use of the first media console by the first user.

2. The method of claim 1, wherein determining a first security profile based on the first user identifier comprises the steps of:

accessing a first user account record at a console service, the first user account record being associated with the first user identifier and including at least one security related entry; and obtaining a first security privilege ticket from the console service, the first security privilege ticket being based on the first user account record and including a first plurality of console security privilege indicators, the privilege indicators corresponding to a plurality of binary flags, and the privilege ticket being embodied in a private key signed data structure which includes a user identifier, a console identifier, and a plurality of data records corresponding to a plurality of configuration settings.

3. The method of claim 2, further comprising the steps of:

(a) determining whether use of the media console by a second user is subject to a second security profile associated with a second user identifier corresponding to the second user, the second security profile having a second plurality of console security privilege indicators corresponding to the first plurality of console security privilege indicators;

(b) comparing each console security privilege indicator of the first security profile with each corresponding console security privilege indicator of the second security profile;

(c) generating an aggregate security profile based on the comparison of the first security profile and the second security profile wherein the more restrictive of each corresponding console security privilege indicator is selected from the first and second pluralities of the first and the second security profiles; and (d) enabling use of the media console, subject to the aggregate security profile, wherein the aggregate security profile supersedes the security profiles associated with the first user identifier and the second user identifier.

4. The method of claim 2, further comprising the steps of:

(a) generating a first user history associated with the first user identifier that enumerates each activity performed on the first console while the first media console is enabled subject to the first security profile;

(b) storing the first user history at the first media console; and (c) providing the first user history to the console service when the first media console is enabled for online communication, wherein the first user history is associated with the first user account record.

5. The method of claim 3, further comprising the steps of:

(a) determining if the second user identifier grants authorization to manage user-specific security settings for the first media console, for the first user identifier; and if so, (b) providing access to a security controls dialog screen for the second user identifier, to enable managing of the user-specific security settings for the first security profile.

6. The method of claim 5, wherein the security controls dialog screen provides a selection of user-specific security setting controls for offline media console use, including each of:

(a) a control for configuring permission to access media based on a media rating;

(b) a control for configuring an online service account;

(c) a control for configuring access to an online service; and (d) a control for configuring access of legacy games.

7. The method of claim 6, wherein the security controls dialog screen provides a plurality of security setting controls for use of the online media console, including each of:

(a) a control for configuring an authorized contact list;

(b) a control for configuring a personal information shield;

(c) a control for configuring permission for online purchases;

(d) a control for configuring a time limit for media console use;

(e) a control for configuring permission to access user created content;

(f) a control for configuring permission to access media based on a local media rating system; and (g) a control for auditing a user history.

8. The method of claim 7, further comprising the step of enabling the second user identifier to access the security controls dialog screen over the Internet via a console service web page.

9. The method of claim 1, wherein the first security profile includes at least one predetermined default security privilege indicator.

10. The method of claim 9, wherein the at least one predetermined default security indicator is automatically selected based on a user age indicator that is associated with the first user identifier.

11. The method of claim 1, further comprising the step of masking the supervised operating configuration enabled by the first security profile, so that the first media console is visible online only to a person on an authorized online contacts list, and communications directed to the first media console that are not from a person on the authorized online contact list are refused for as long as use of the first media console is subject to the first security profile.

12. The method of claim 1, wherein the first security profile defines an access permission level for communication with online contacts and is set to permit one of:
(a) unrestricted online contact communication access;
(b) no online contact communication access; and
(c) restricted online contact communication access, based on a predefined authorized contacts list.

13. A system for enabling user-specific security setting management for a media console to facilitate parental control, the system having a console service configured for executing a plurality of security setting management functions, the console service being configured for securely communicating with a user console over a network and including:
a database in which are stored records employed for managing one or more user-specific security settings; and
a server computer in communication with the database, the server computer including a processor, and a memory in communication with the processor, the memory storing data and machine instructions that cause the processor to carry out a plurality of functions, including:
establishing a plurality of security profiles by displaying a main dialog screen and receiving input from the main dialog screen for managing security controls, the main dialog screen comprising options for console settings, parental controls, profiles, memory, network, USB devices, media connect, and system setup, each option enabling a user to navigate to at least one other dialog screen associated with the each option;
identifying a request for a per-session console security configuration received from a first console, the request including a first user identifier and a first console identifier;
in response to identifying the request, matching the first user identifier with a first user account record in the database, the first user account record including a primary console identifier associated with the first user identifier and at least one security related entry;
generating a security privileges ticket based on the user account record and the request, the security privileges ticket including a plurality of console security configuration permission indicators that identify desired parental control choices for the first user identifier, the plurality of console security configuration permission indicators comprising a permission level for online purchases, a time limit for media console use, and a control of online contact access; and
providing the security privileges ticket to the first console, to effect the desired parental control choices.

14. The system of claim 13, wherein the security related entry is one of:
(a) a personal identification number;
(b) a console control configuration setting;
(c) an age indicator
(d) a predefined authorized contacts list; and
(e) a primary console identifier.

15. The system of claim 14, wherein the console control configuration setting includes each of:
(a) an indicator that unrestricted online contact communication access is permitted;
(b) an indicator that no online contact communication access is permitted;
(c) an indicator that restricted online contact communication access is permitted based on the predefined authorized contacts list;
(d) an indicator that enables a personal information shield;
(e) an indicator that sets a permission level for online purchases;
(f) an indicator that sets a time limit for media console use;
(g) an indicator that restricts permission to access user-created content;
(h) an indicator that sets a permission level for accessing media based on a local media rating system; and
(i) an indicator that sets permission to audit a user history.

16. The system of claim 13, wherein the machine instructions further cause the processor to execute a plurality of functions, including:
(a) identifying console security data received from the first user console, wherein the console security data includes user history and at least one console control configuration setting; and
(b) associating the received console configuration data with the first user account record.

17. The system of claim 13, wherein the machine instructions further cause the processor to provide a web portal on the server computer within a web hosting application and to implement a plurality of functions, including:
(a) detecting a request for access to the first user account record from the web portal, the request including a second user account identifier associated with a second user, wherein the second user account identifier is an authenticated online service identifier; and
(b) determining if the second user identifier is authorized to manage the first console security configuration; and if so,
(c) providing access to a console security configuration dialog screen to enable the second user to manage the first console security configuration by making the desired parental control choices.

18. A memory medium on which are stored machine instructions which, when executed upon one or more computer processors, carry out a plurality of steps that effect parental control over user rights, comprising:
establishing a plurality of security profiles by displaying a main dialog screen and receiving input from the main dialog screen for managing security controls, the main dialog screen comprising options for console settings, parental controls, profiles, memory, network, USB devices, media connect, and system setup, each option enabling a user to navigate to at least one other dialog screen associated with the each option;
identifying a personal identification number received from a user interface of a media console, the personal identification number corresponding to a corresponding user of the media console;
determining a user rights configuration for the media console based on the personal identification number that was identified, the user rights configuration defining a plurality of operational settings for the media console that are specific to the personal identification number, and thus, specific to the corresponding user and which define user rights in accord with parental control choices, the operational settings comprising a permission level for online purchases, a time limit for media console use, and a control of online contact access; and
applying the determined user rights configuration to the media console for as long as the corresponding user is using the media console, to facilitate parental control over the user of the media console.

19. The memory medium of claim 18, wherein the machine instructions, when executed, further carry out the steps of:
(a) requesting a user rights configuration ticket from a console service, a request for the user rights configuration ticket including the personal identification number and a media console identifier corresponding to the media console;

(b) accessing a user account record at the console service, the user account record being associated with the personal identification number and including at least one user rights related entry; and (c) obtaining a user rights configuration ticket from the console service, the user rights configuration privilege ticket being based on the user account record and including a plurality of operational setting indicators.

20. The memory medium of claim 18, wherein the machine instructions are further executable for carrying out the steps of:

(a) determining if the personal identification number grants authorization to manage user rights settings for the media console based on the user identifier; and if so, (b) providing access to a user rights controls dialog screen to enable modification of operational settings for the user rights configuration.

* * * * *